US012759612B1

(12) United States Patent
Itani et al.

(10) Patent No.: US 12,759,612 B1
(45) Date of Patent: Oct. 13, 2026

(54) SNAP BUSHING FOR A COMMERCIAL VEHICLE

(71) Applicant: ZF Active Safety and Electronics US LLC, Livonia, MI (US)

(72) Inventors: Tamara Itani, West Lafayette, IN (US); Alex Schieler, Otterbein, IN (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 0 days.

(21) Appl. No.: 19/321,390

(22) Filed: Sep. 8, 2025

(51) Int. Cl.
*B62D 1/16* (2006.01)

(52) U.S. Cl.
CPC ...................................... *B62D 1/16* (2013.01)

(58) Field of Classification Search
CPC ........ B62D 1/16; B60R 13/06; B60K 2360/84
See application file for complete search history.

(56) References Cited

U.S. PATENT DOCUMENTS

| | | | |
|---|---|---|---|
| 3,941,965 | A | 3/1976 | Piber |
| 4,137,602 | A | 2/1979 | Klumpp, Jr. |
| 4,687,164 | A | 8/1987 | Bakhaus et al. |

FOREIGN PATENT DOCUMENTS

| | | | | | |
|---|---|---|---|---|---|
| DE | 202011001993 | U1 | | 4/2011 | |
| DE | 102016114678 | A1 | * | 2/2018 | F16C 17/26 |
| DE | 102013202819 | B4 | * | 11/2022 | F16C 33/74 |
| DK | 9600300 | U3 | | 12/1996 | |
| EP | 3943367 | A1 | * | 1/2022 | B62K 5/08 |
| FR | 2973767 | A1 | * | 10/2012 | F16C 27/063 |
| KR | 20060098608 | A | * | 9/2006 | B62D 1/16 |
| WO | WO-9719274 | A1 | * | 5/1997 | F16C 35/063 |

OTHER PUBLICATIONS

Arvand, DE-102013202819-B4, Machine Translation of Specification (Year: 2022).*
Huber, DE-102016114678-A1, Machine Translation of Specification (Year: 2018).*
Monnet, FR-2973767-A1, Machine Translation of Specification (Year: 2012).*
Park, KR-20060098608-A, Machine Translation of Specification (Year: 2006).*

* cited by examiner

*Primary Examiner* — Jason D Shanske
*Assistant Examiner* — Matthew Joseph Ganci
(74) *Attorney, Agent, or Firm* — LEYDIG, VOIT & MAYER, LTD.

(57) ABSTRACT

A steering assembly for a vehicle, includes a housing mounted to a firewall. The housing defines a first through hole. A top cap defines a second through hole mounted on the housing. The top cap and housing define a chamber. A portion of the steering shaft within the through holes includes an upper groove and an axially spaced lower groove each circumferentially surrounding the shaft. A bearing is disposed in the chamber and circumferentially surrounding the steering shaft. The bearing has an upper snapping mechanism that snaps into the upper groove, and a lower snapping mechanism that snaps into the lower groove. A convex outer surface of the steering shaft abuts an inner wall of the chamber, and an inner convex surface abuts the intermediate shaft. The bearing limits an axial movement of the steering shaft via the upper and lower snapping mechanisms and permits rotation of the steering shaft.

20 Claims, 3 Drawing Sheets

SNAP BUSHING FOR A COMMERCIAL VEHICLE

FIELD

The present disclosure pertains to the field of steering systems for commercial vehicles, in particular a snap bushing for a steering column of the commercial vehicle.

BACKGROUND

Conventional designs for rotational components typically employ regular ball bearings secured in place using two snap rings. While functionally adequate, this configuration is resource intensive due because of the additional securing hardware required.

Alternative solutions include round plastic self-lubricating bushings, when used in conjunction with snap rings, are unable to rotate freely, as the snap rings restrict movement. Conversely, if the snap rings are removed, the bushings fail to remain in a fixed axial position within the housing, leading to undesirable shifting during operation.

Additionally, most snap bushings currently on the market are primarily designed for locking into a fixed structure, rather than facilitating free rotational movement. These designs prioritize axial retention over rotational functionality, thereby limiting their applicability in vehicular systems where both secure positioning and smooth rotation are required.

SUMMARY

A first aspect of the present disclosure provides a steering assembly for a vehicle. The steering assembly comprises a housing configured to be mounted to a chassis of the vehicle, at a firewall between a driver cab and an engine bay of the vehicle, wherein the housing defines a first through hole connecting the driver cab and the engine bay, a top cap defining a second through hole mounted on the housing on a side facing away from the firewall, the top cap and housing defining a chamber therebetween, a steering shaft disposed in the first and second through holes, having a first end mechanically coupled to an upper steering shaft, and a second end mechanically coupled to a lower steering shaft, and wherein a portion of the steering shaft within the first and second through holes includes an upper groove and an axially spaced lower groove each circumferentially surrounding the shaft. An annular bearing disposed in the chamber and circumferentially surrounding the steering shaft, the annular bearing has an upper snapping mechanism that is configured to snap into the upper groove, and a lower snapping mechanism configured to snap into the lower groove. An outer convex surface abutting an inner wall of the chamber, and an inner convex surface that abuts the steering shaft, where the annular bearing is configured to limit an axial movement of the steering shaft via the upper and lower snapping mechanisms during operation of the vehicle and to permit rotation of the steering shaft.

According to an implementation of the first aspect, the annular bearing is a single piece bearing.

According to an implementation of the first aspect, the annular bearing is composed of a combination of nylon and glass fibers.

According to an implementation of the first aspect, the steering shaft has a surface diameter, wherein the upper groove and the lower groove have a groove diameter, and wherein the groove diameter is less than the surface diameter.

According to an implementation of the first aspect, the annular bearing has an inner diameter based on the upper snapping mechanism and the lower snapping mechanism, and wherein the inner diameter of the annular bearing is less than the surface diameter.

According to an implementation of the first aspect, the annular bearing is disposed around the steering shaft by sliding the annular bearing along the steering shaft in an axial direction.

According to an implementation of the first aspect, the upper snapping mechanism and the lower snapping mechanism are configured to bend in an outward direction and transition from a resting state to an extended state while the annular bearing is disposed around a portion of the steering shaft that does not include the upper groove and the lower groove.

According to an implementation of the first aspect, the upper snapping mechanism and the lower snapping mechanism return to the rest state from the extended state when the annular bearing is disposed around a portion of the steering shaft that includes the upper groove and the lower groove.

According to an implementation of the first aspect, the annular bearing comprises a plurality of relief cuts equally spaced around the annular bearing.

According to an implementation of the first aspect, the annular bearing includes an outer convex surface that abuts the inner wall of the chamber, and where a first radius of curvature of the outer convex surface of the annular bearing is designed based on a second radius of curvature of the inner wall of the chamber.

A second aspect of the present disclosure provides a method for installing a steering assembly for a vehicle. The method includes providing a housing configured to be mounted to a chassis of the vehicle, at a firewall between a driver cab and an engine bay of the vehicle, wherein the housing defines a first through hole connecting the driver cab and the engine bay, providing a top cap defining a second through hole mounted on the housing on a side facing away from the firewall, the top cap and housing defining a chamber therebetween, providing a steering shaft disposed in the first and second through holes, having a first end mechanically coupled to an upper steering shaft, and a second end mechanically coupled to a lower steering shaft, and wherein a portion of the steering shaft within the first and second through holes includes an upper groove and an axially spaced lower groove each circumferentially surrounding the shaft, providing an annular bearing disposed in the chamber and circumferentially surrounding the steering shaft, the annular bearing having an upper snapping mechanism that is configured to snap into the upper groove, and a lower snapping mechanism configured to snap into the lower groove, an outer convex surface abutting an inner wall of the chamber; and an inner convex surface that abuts the steering shaft. The annular bearing is configured to limit an axial movement of the steering shaft via the upper and lower snapping mechanisms during operation of the vehicle and to permit rotation of the steering shaft.

According to an implementation of the second aspect, the annular bearing is a single piece bearing.

According to an implementation of the second aspect, the annular bearing is composed of a combination of nylon and glass fibers.

According to an implementation of the second aspect, the steering shaft has a surface diameter, wherein the upper groove and the lower groove have a groove diameter, and wherein the groove diameter is less than the surface diameter.

According to an implementation of the second aspect, the annular bearing has an inner diameter based on the upper snapping mechanism and the lower snapping mechanism, and wherein the inner diameter of the annular bearing is less than the surface diameter.

According to an implementation of the second aspect, the annular bearing is disposed around the steering shaft by sliding the annular bearing along the steering shaft in an axial direction.

According to an implementation of the second aspect, the upper snapping mechanism and the lower snapping mechanism are configured to bend in an outward direction and transition from a resting state to an extended state while the annular bearing is disposed around a portion of the steering shaft that does not include the upper groove and the lower groove.

According to an implementation of the second aspect, the upper snapping mechanism and the lower snapping mechanism return to the rest state from the extended state when the annular bearing is disposed around a portion of the steering shaft that includes the upper groove and the lower groove.

According to an implementation of the second aspect, the annular bearing comprises a plurality of relief cuts equally spaced around the annular bearing.

According to an implementation of the second aspect, the annular bearing includes an outer convex surface that abuts the inner wall of the chamber, and where a first radius of curvature of the outer convex surface of the annular bearing is designed based on a second radius of curvature of the inner wall of the chamber.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
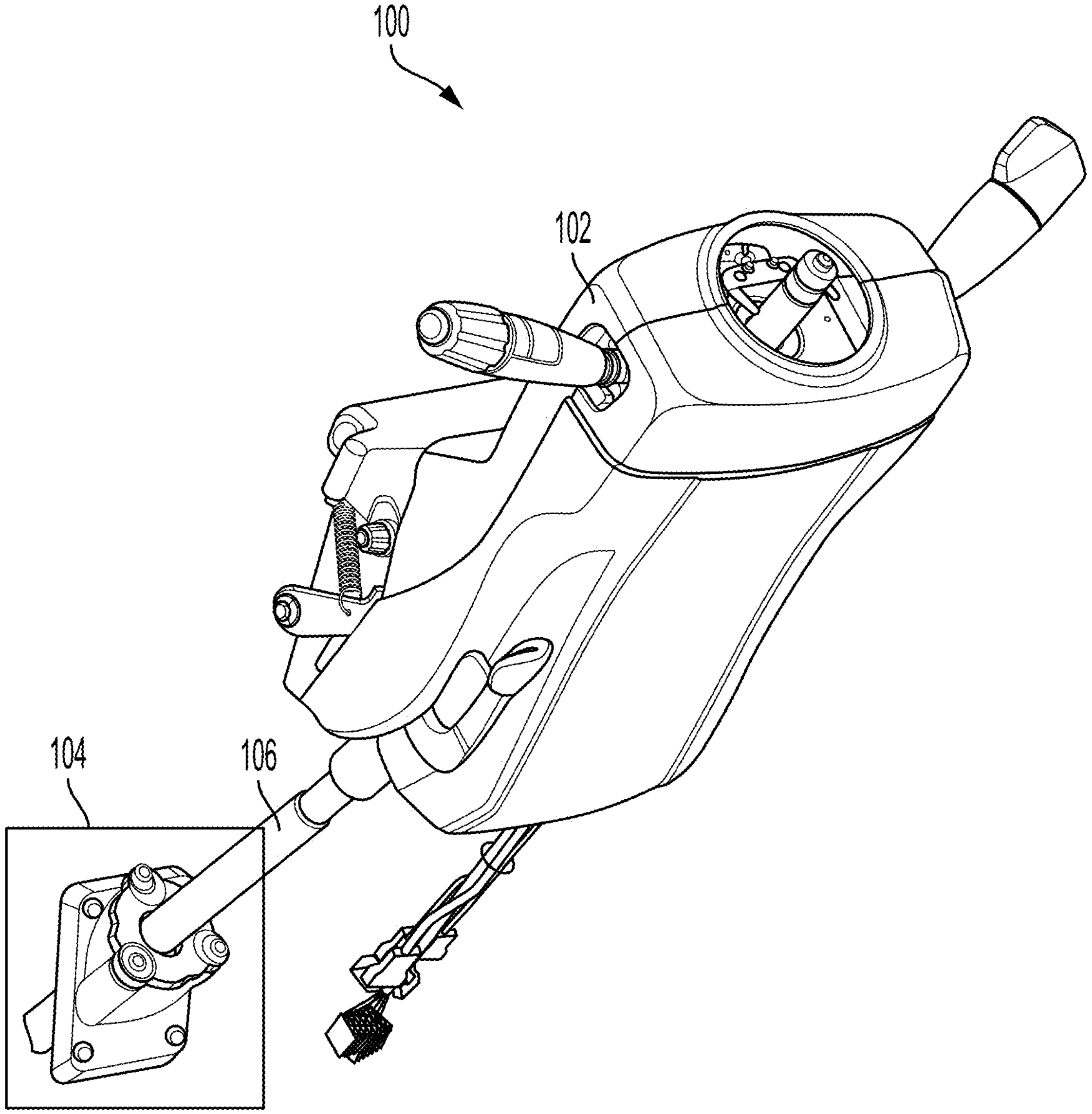
FIG. 1 illustrates a perspective view of a portion of an exemplary steering column of a vehicle, according to one or more examples of the present disclosure.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term “a” and/or “an” shall mean “one or more” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on”.

A steering column of a vehicle is usually composed of three parts, an upper steering shaft, an intermediate shaft, and a lower steering shaft. The upper steering shaft includes an input shaft that connects to a steering wheel of the vehicle to receive a rotation command from a driver of the vehicle. The upper steering shaft may also include mechanisms that facilitate a tilt or telescopic operation of the steering wheel based on the needs of a driver of the vehicle. The lower end of the upper steering shaft is mechanically coupled to an intermediate shaft. The lower end of the intermediate shaft may be mechanically coupled to the lower steering shaft. The intermediate steering shaft transmits the rotation received at the upper steering shaft to the lower steering shaft. The lower steering shaft may include steering gears that are configured to perform steering operation of the vehicle.

During operation of the vehicle, the intermediate shaft of the steering column may experience large amounts of undesirable axial force that may cause the intermediate shaft to slide along its length. This motion caused by the axial force causes unwanted wear and tear of the intermediate shaft. For smooth operation of the intermediate shaft, a bushing is mechanically coupled around the intermediate shaft of the steering column to limit the axial motion of the intermediate shaft, while allowing for smooth rotation of the intermediate shaft as it transmits rotation from the upper steering shaft to the lower steering shaft.

Conventional bushings are often composed of regular ball bearings with two snap rings. However, the snap rings may prevent the ball bearings from rotating, and without the snap rings, the ball bearings would not rotate in a fixed position, thereby allowing unwanted axial motion of the intermediate shaft. Conventional bushings are also used to lock into something, and none of them are made to spin on a shaft.

Embodiments of the present disclosure provide a unified self-lubricating snap bushing that is configured to snap into snap grooves that are provided on the intermediate shaft. The snap bushing is designed using self-lubricating material that not only reduces axial motion of the intermediate shaft but also allows for smooth rotation of the intermediate shaft as it transmits rotation received at the upper steering shaft to the lower steering shaft for steering of the vehicle.

FIG. 1 illustrates a perspective view of a portion of an exemplary steering column of a vehicle, according to one or more examples of the present disclosure. FIG. 1 illustrates a portion of a steering column 100 that includes an upper steering shaft 102 and an intermediate shaft 106. As shown in FIG. 1, an upper end of the intermediate shaft 106 is mechanically coupled to a lower end of the upper steering shaft 102. A lower end of the intermediate shaft 106 may be mechanically coupled to a lower steering shaft. An input from a driver of the vehicle is received at the upper steering shaft 102 and transmitted to the lower steering shaft via the intermediate shaft 104. In some embodiments, the upper steering shaft 102 may be disposed within a driver cab of a vehicle. Additionally, a portion of the intermediate shaft 106 may be disposed within the driver cab of the vehicle. The engine bay of the vehicle may include the lower steering shaft that is responsible for performing the steering operation of the vehicle. In order for optimal operation of the engine of the vehicle, the driver cab is separated from the engine bay of the vehicle using a firewall 104.

The firewall 104 in a vehicle serves as a safety and comfort feature by providing both fire protection and insulation from sound and heat. In the event of an engine fire, the firewall housing acts as a barrier, helping to prevent flames and hazardous fumes from reaching the passenger compartment. The firewall 104 is typically constructed from fire-resistant materials like steel or specially treated composites that can withstand high temperatures. In addition to fire safety, the firewall 104 also insulates the cabin from the noise, vibrations, and heat generated by the engine. The firewall 104 is often lined with sound-deadening and thermal insulation materials, which reduce engine roar and help maintain a comfortable interior temperature. This dual function enhances both the safety and driving experience of the vehicle.

A housing is designed within the firewall 104 that allow the intermediate shaft 106 to connect the upper steering shaft 102 disposed in the driver cab of the vehicle to the lower steering system located in the engine bay of the vehicle. As shown in FIG. 1, a portion of the intermediate shaft 106 is disposed within the housing designed within the firewall 104. The structure of the housing within the firewall is descried more detail with respect to FIG. 2.

Figure 2:
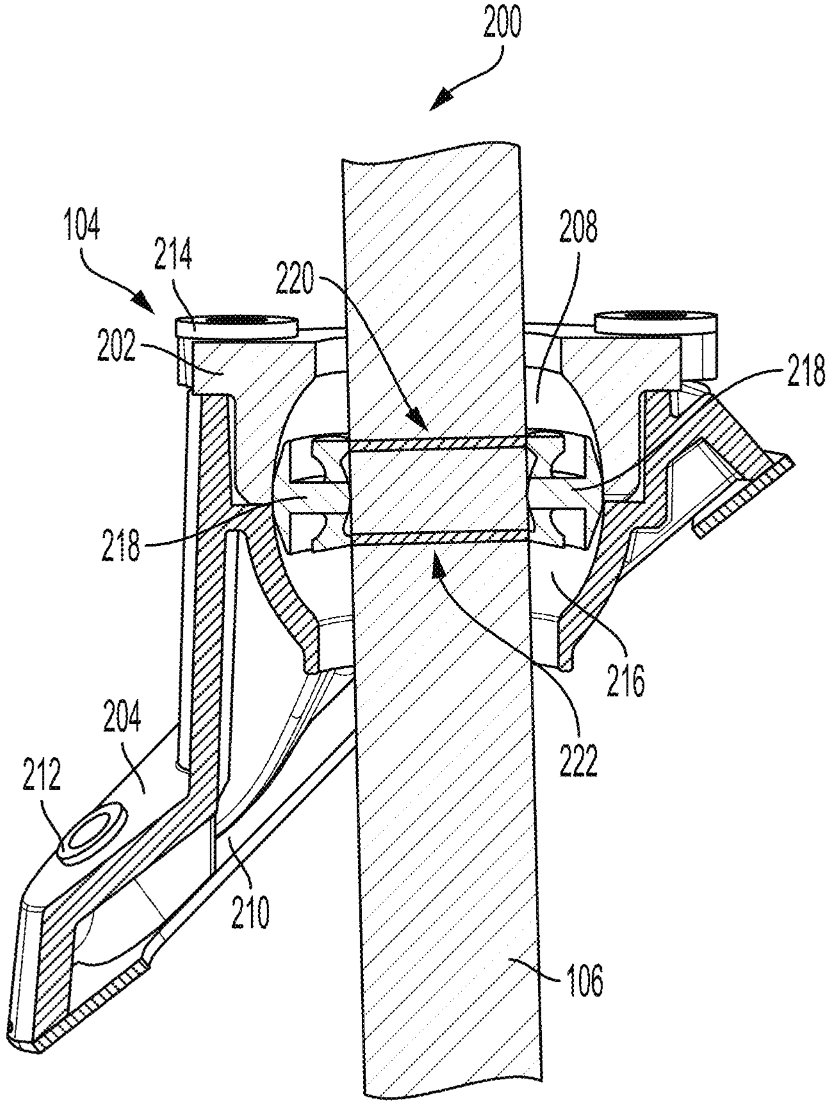
FIG. 2 illustrates a cross-sectional view of a portion of a steering shaft of the steering column of the commercial vehicle, according to one or more embodiments of the present disclosure.

FIG. 2 illustrates a cross-sectional view of a portion of a steering shaft of the steering column of the commercial vehicle, according to one or more embodiments of the present disclosure. Cross-sectional view 200 of FIG. 2 illustrates a portion of the intermediate shaft 106 that is disposed within the housing 204 of the firewall 104. The housing 204 of the firewall 104 is mechanically coupled to a chassis 210 of the vehicle using fastening means 212. The housing 204 defines a first through hole 216. A top cap 202 is mechanically coupled to the housing 204 using fastening means 214 on a side facing away from the firewall 104. In some embodiments, the fastening means 212 and 214 may be one or more of a fastener, screw, bolts or any other similar fastening means that couples the housing 204 to the chassis 210 and also couples the top cap 202 to the housing 204.

The top cap 202 defines a second through hole 208. The first through hole 216 and the second through hole 208 together form a chamber. A portion of the intermediate shaft 106 is disposed through the first through hole 216, the second through hole 208, and the chamber formed by the first through hole 216 and the second through hole 208. As discussed with respect to FIG. 1, the intermediate shaft 106 is configured to connect the upper steering shaft 102 to the lower steering shaft and transmit the rotation received at the upper steering shaft 102 to the lower steering shaft.

While the intermediate shaft 106 is configured to rotate to transmit the rotation from the upper steering shaft 102 to the lower steering shaft, the intermediate shaft 106 may also be susceptible to forces that cause the intermediate shaft 106 to move in an axial manner during operation. In order to reduce the undesirable axial motion of the intermediate shaft 106, an annular bearing 218 is disposed around the portion of the steering shaft in the chamber created by the first through hole 216 of the housing 204 and the second through hole 208 of the top cap 202.

In some embodiments, the intermediate shaft 106 includes a plurality of grooves that circumferentially surround the intermediate shaft 106 and are configured to receive the annular bearing 218. For example, the intermediate shaft 106 includes a first groove 220 (e.g., an upper groove), and a second groove 222 (e.g., a lower groove), where the second groove 222 is axially spaced from the first groove 220. In some embodiments, an outer surface of the first groove 220 and the second groove 222 may have a groove radius that is lower than the shaft radius of the outer surface intermediate shaft 106.

An inner surface of the annular bearing 218 may be designed to have a lower radius than an outer surface, so that the annular bearing 218 may form a secure fit around the intermediate shaft 106. In some embodiments, the inner surface of the annular bearing 218 includes a first snapping mechanism that engages with the first groove 220 of the intermediate shaft 106, and a second snapping mechanism that engages with the second groove 222 of the intermediate shaft 106, respectively.

In some embodiments, the annular bearing may be installed on the intermediate shaft 106 by sliding the annular bearing 106 along the intermediate shaft 106 until the annular bearing 106 reaches first groove and the second groove. As the annular bearing 218 is being slid along the intermediate shaft 106, the first snapping mechanism and the second snaping mechanism may be designed so as to bend because of the shaft radius being greater than the inner surface of the annular bearing 218. Upon reaching the first groove and the second groove, the first and second snapping mechanisms may be configured to readjust based on the groove radius being lesser than the shaft radius. For example, the first snapping mechanism may snap into the first groove and the second snapping mechanism may snap into the second groove, thereby holding the annular bearing 218 stationary in an axial direction with respect to the intermediate shaft 106.

The annular bearing 218 may also include a convex outer surface that abuts against the walls of the chamber created by the first through hole 216 of the housing 204 and the second through hole 208 of the top cap 202. In some embodiments, a curvature of the outer surface of the annular bearing 218 may be designed in a way to match the curvature of the chamber created by the first through hole 216 of the housing 204 and the second through hole 208 of the top cap 202. The convex outer surface along with the first snapping mechanism and the second snapping mechanism of the annular bearing 218 may be configured to reduce the axial motion of the intermediate shaft 106.

In some embodiments, the annular bearing 218 may also include a convex inner surface that abuts the intermediate shaft 106. The convex inner surface allows for the intermediate shaft 106 to rotate freely as it transmits steering commands received at the upper steering shaft 102 to the lower steering shaft.

Figure 3A:
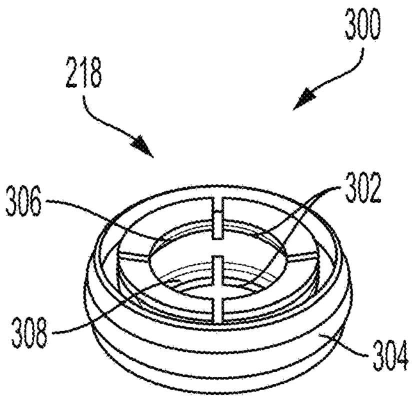
FIGS. 3A-3C illustrate different views of an annular bearing, according to one or more embodiments of the present disclosure.
Figure 3B:
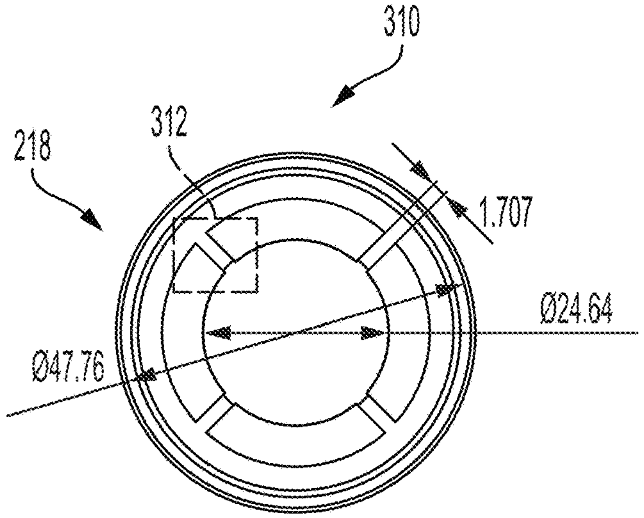
Figure 3C:
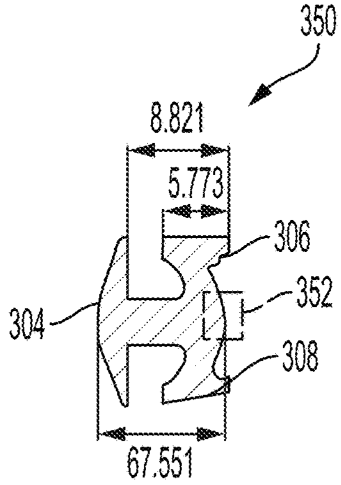

FIGS. 3A-3C illustrate different views of an annular bearing, according to one or more embodiments of the present disclosure.

FIG. 3A provides a perspective view of the annular bearing 218. Perspective view 300 of the annular bearing depicts an inner surface 302 and an outer surface 304. As shown in FIG. 3A, the annular bearing 218 is a single-piece unified bearing. The inner surface includes a first snapping mechanism 306 and a second snapping mechanism 308. The first snapping mechanism 306 is configured to snap into the first groove 220 of the intermediate shaft 106, and the second mechanism 308 is designed to snap into the second groove 222 of the intermediate shaft 106.

An inner diameter of the inner surface 302 of the annular bearing 218 is measured based on the first snapping mechanism 306 and the second snapping mechanism 308. In order to hold the annular bearing 218 in an axially stationary position with respect to the intermediate shaft 106, the inner diameter of the inner surface 302 is less than the surface diameter of the intermediate shaft 106. The annular bearing 218 may be disposed around the intermediate shaft 106 by sliding the annular bearing along the length of the intermediate shaft 106. Because the inner diameter of the inner surface 302 is less than the surface diameter of the intermediate shaft 106, the first snapping mechanism 306 and the second snapping mechanism 308 may be configured to bend outwards as the annular bearing 218 is moved axially along the intermediate shaft 106. Additionally, and/or alternatively, because the inner diameter of the inner surface 302 is less than the surface diameter of the intermediate shaft 106, the first snapping mechanism 306 and the second snapping mechanism 308 may be configured to bend inwards as the annular bearing 218 is moved axially along the intermediate shaft 106. Once the annular bearing 218 comes close to the first groove 220 and the second groove 222, the first snapping mechanism 306 and the second snapping mechanism 308 return to their resting position by bending in an opposite direction. In the resting state, the first snapping mechanism 306 and the second snapping mechanism interact with the first groove 220 and the second groove 222 respectively, in order to hold the annular bearing 218 in in an axially stationary manner with respect to the intermediate shaft 106.

An outer surface 304 of the annular bearing 218 is configured to abut a wall of a chamber created by the first through hole 216 of the housing 204 and the second through hole 208 of the top cap 202, as discussed with respect to FIG. 2. In some embodiments, the outer surface 304 of the annular bearing 218 has a convex curvature that helps in aligning the annular bearing 218 along the walls of the chamber. A radius of curvature of the convex curvature of the outer surface 304 may be designed based on the radius of curvature of the walls of the chamber. In some embodiments, the annular bearing 218 is composed of a compound of nylon and glass fibers. For example, the annular bearing 218 may be composed of a compound that has nylon with approximately 30% glass fibers.

FIG. 3B provides a top-down view of the annular bearing 218. Top-down view 310 of FIG. 3B depicts relief cuts 312 disposed along the annular bearing 218. In some embodiments, each of the plurality of relief cuts 312 are disposed at equal distance along the top surface of the annular bearing 218. The relief cuts 312 facilitate the first snapping mechanism 306 and the second snapping mechanism 308 to bend as the annular bearing 218 is slid axially along the intermediate shaft 106.

FIG. 3C provides a cross-section view of the annular bearing 218. Cross-section view 350 illustrates the convex outer surface 304 of the annular bearing 218. As discussed previously, a radius of curvature of the convex curvature of the outer surface 304 may be designed based on the radius of curvature of the walls of the chamber, because outer surface 304 of the annular bearing 218 is configured to abut the wall of a chamber. Cross-section view 350 also illustrates the first snapping mechanism 306 (e.g., upper snapping mechanism) and the second snapping mechanism 308 (e.g., the lower snapping mechanism). The inner diameter of the annular bearing 218 is delineated based on the first snapping mechanism 306 and the second snapping mechanism 308. In some embodiments, the inner diameter of the annular bearing 218 is less than the surface diameter of the intermediate shaft 106. As discussed with respect to FIG. 3A, the first snapping mechanism 306 and the second snapping mechanism 308 are configured to bend outwards at an angle so that the annular bearing 218 may slide smoothly over the surface of the intermediate shaft 106, having larger diameter than the inner diameter of the annular bearing 218. In some embodiments, the outward bending of the first snapping mechanism 306 and the second snapping mechanism 308 transitions the first snapping mechanism 306 and the second snapping mechanism 308 to an extended state. The first snapping mechanism 306 and the second snapping mechanism 308 remain in the extended state as the annular bearing 218 is moved along the intermediate shaft 106 in the axial direction.

Once the annular bearing 218 comes close to the first groove 220 and the second groove 222, the first snapping mechanism 306 and the second snapping mechanism 308 return to their resting position by bending inwards. In the resting state, the first snapping mechanism 306 and the second snapping mechanism interact with the first groove 220 and the second groove 222 of the intermediate shaft 106 respectively, in order to hold the annular bearing 218 in in an axially stationary manner with respect to the intermediate shaft 106.

Cross-section view 350 also illustrates a convex inner surface 352 that abuts the outer surface of the intermediate shaft 106. The convex inner surface 352 is configured to facilitate the free rotation of the intermediate shaft 106 based on the steering input received at the upper steering shaft 102.

In some embodiments, the annular bearing 218 may be a unified bearing, composed of a single piece, with the described above.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A steering assembly for a vehicle, comprising:

a housing configured to be mounted to a chassis of the vehicle, at a firewall between a driver cab and an engine bay of the vehicle, wherein the housing defines a first through hole connecting the driver cab and the engine bay;

a top cap defining a second through hole mounted on the housing on a side facing away from the firewall, the top cap and housing defining a chamber therebetween;

a steering shaft disposed in the first and second through holes, having a first end mechanically coupled to an upper steering shaft, and a second end mechanically coupled to a lower steering shaft, and wherein a portion of the steering shaft within the first and second through holes includes an upper groove and an axially spaced lower groove each circumferentially surrounding the shaft; and an annular bearing disposed in the chamber and circumferentially surrounding the steering shaft, the annular bearing having:

an upper snapping mechanism that is configured to snap into the upper groove, and a lower snapping mechanism configured to snap into the lower groove;

an outer convex surface abutting an inner wall of the chamber; and an inner convex surface that abuts the steering shaft, wherein the annular bearing is configured to limit an axial movement of the steering shaft via the upper and lower snapping mechanisms during operation of the vehicle and to permit rotation of the steering shaft.

2. The steering assembly of claim 1, wherein the annular bearing is a single piece bearing.

3. The steering assembly of claim 1, wherein the annular bearing is composed of a combination of nylon and glass fibers.

4. The steering assembly of claim 1, wherein the steering shaft has a surface diameter, wherein the upper groove and the lower groove have a groove diameter, and wherein the groove diameter is less than the surface diameter.

5. The steering assembly of claim 4, wherein the annular bearing has an inner diameter based on the upper snapping mechanism and the lower snapping mechanism, and wherein the inner diameter of the annular bearing is less than the surface diameter.

6. The steering assembly of claim 5, wherein the annular bearing is disposed around the steering shaft by sliding the annular bearing along the steering shaft in an axial direction.

7. The steering assembly of claim 6, wherein the upper snapping mechanism and the lower snapping mechanism are configured to bend in an outward direction and transition from a resting state to an extended state while the annular bearing is disposed around a portion of the steering shaft that does not include the upper groove and the lower groove.

8. The steering assembly of claim 7, wherein the upper snapping mechanism and the lower snapping mechanism return to the rest state from the extended state when the annular bearing is disposed around a portion of the steering shaft that includes the upper groove and the lower groove.

9. The steering assembly of claim 1, wherein the annular bearing comprises a plurality of relief cuts equally spaced around the annular bearing.

10. The steering assembly of claim 1, wherein a first radius of curvature of the outer convex surface of the annular bearing is designed based on a second radius of curvature of the inner wall of the chamber.

11. A method for installing a steering assembly for a vehicle, comprising:

providing a housing configured to be mounted to a chassis of the vehicle, at a firewall between a driver cab and an engine bay of the vehicle, wherein the housing defines a first through hole connecting the driver cab and the engine bay;

providing a top cap defining a second through hole mounted on the housing on a side facing away from the firewall, the top cap and housing defining a chamber therebetween;

providing a steering shaft disposed in the first and second through holes, having a first end mechanically coupled to an upper steering shaft, and a second end mechanically coupled to a lower steering shaft, and wherein a portion of the steering shaft within the first and second through holes includes an upper groove and an axially spaced lower groove each circumferentially surrounding the shaft; and providing an annular bearing disposed in the chamber and circumferentially surrounding the steering shaft, the annular bearing having:

an upper snapping mechanism that is configured to snap into the upper groove, and a lower snapping mechanism configured to snap into the lower groove;

an outer convex surface abutting an inner wall of the chamber; and an inner convex surface that abuts the steering shaft, wherein the annular bearing is configured to limit an axial movement of the steering shaft via the upper and lower snapping mechanisms during operation of the vehicle and to permit rotation of the steering shaft.

12. The method of claim 11, wherein the annular bearing is a single piece bearing.

13. The method of claim 11, wherein the annular bearing is composed of a combination of nylon and glass fibers.

14. The method of claim 11, wherein the steering shaft has a surface diameter, wherein the upper groove and the lower groove have a groove diameter, and wherein the groove diameter is less than the surface diameter.

15. The method of claim 14, wherein the annular bearing has an inner diameter based on the upper snapping mechanism and the lower snapping mechanism, and wherein the inner diameter of the annular bearing is less than the surface diameter.

16. The method of claim 15, wherein the annular bearing is disposed around the steering shaft by sliding the annular bearing along the steering shaft in an axial direction.

17. The method of claim 16, wherein the upper snapping mechanism and the lower snapping mechanism are configured to bend in an outward direction and transition from a resting state to an extended state while the annular bearing is disposed around a portion of the steering shaft that does not include the upper groove and the lower groove.

18. The method of claim 17, wherein the upper snapping mechanism and the lower snapping mechanism return to the rest state from the extended state when the annular bearing is disposed around a portion of the steering shaft that includes the upper groove and the lower groove.

19. The method of claim 11, wherein the annular bearing comprises a plurality of relief cuts equally spaced around the annular bearing.

20. The method of claim 11, wherein a first radius of curvature of the outer convex surface of the annular bearing is designed based on a second radius of curvature of the inner wall of the chamber.

* * * * *